(12) United States Patent
Guedalia et al.

(10) Patent No.: US 9,002,329 B2
(45) Date of Patent: Apr. 7, 2015

(54) MOBILE COMMUNICATION IN A NETWORK-DEVICE ENVIRONMENT

(75) Inventors: Isaac David Guedalia, Bet Shemesh (IL); Jacob Guedalia, Newton, MA (US)

(73) Assignee: Qualcomm Connected Experiences, Inc., San Diego, CA (US)

( * ) Notice: Subject to any disclaimer, the term of this patent is extended or adjusted under 35 U.S.C. 154(b) by 913 days.

(21) Appl. No.: 12/394,925

(22) Filed: Feb. 27, 2009

(65) Prior Publication Data

US 2009/0227246 A1 Sep. 10, 2009

Related U.S. Application Data

(60) Provisional application No. 61/031,706, filed on Feb. 27, 2008, provisional application No. 61/032,079, filed on Feb. 28, 2008.

(51) Int. Cl.
| | |
|---|---|
| H04M 3/42 | (2006.01) |
| H04M 3/493 | (2006.01) |
| H04L 29/12 | (2006.01) |
| H04M 1/2745 | (2006.01) |

(52) U.S. Cl.
CPC ......... H04M 3/4931 (2013.01); H04L 61/1594 (2013.01); H04M 3/42178 (2013.01); H04M 1/274516 (2013.01)

(58) Field of Classification Search
CPC ............ H04L 61/1594; H04M 3/4931; H04M 1/274516; H04M 3/42178
USPC ................ 455/412.1, 414.1–414.4, 415, 461; 715/739
See application file for complete search history.

(56) References Cited

U.S. PATENT DOCUMENTS

| | | | |
|---|---|---|---|
| 7,440,445 B1 * | 10/2008 | Croak et al. ................. | 370/352 |
| 2002/0169984 A1 | 11/2002 | Kumar et al. | |
| 2004/0044771 A1 | 3/2004 | Allred et al. | |
| 2005/0113078 A1 * | 5/2005 | Deitrich ........................ | 455/417 |
| 2006/0172749 A1 * | 8/2006 | Sweeney ....................... | 455/466 |
| 2007/0189503 A1 * | 8/2007 | Pearson et al. ............ | 379/355.04 |
| 2007/0223683 A1 * | 9/2007 | Pearson .................... | 379/355.01 |
| 2008/0049919 A1 * | 2/2008 | Pounds et al. ............ | 379/201.04 |
| 2009/0028179 A1 * | 1/2009 | Albal ............................ | 370/465 |

FOREIGN PATENT DOCUMENTS

| | | |
|---|---|---|
| WO | 2005065296 A | 7/2005 |
| WO | 2007025373 A | 3/2007 |

* cited by examiner

*Primary Examiner* — George Eng
*Assistant Examiner* — Marcus Hammonds
(74) *Attorney, Agent, or Firm* — Muncy, Geissler, Olds & Lowe, P.C.

(57) ABSTRACT

A system of provisioning contact information associated with one or more contacts of a communication device user may include a first processing device associated with a first service provider, a first computer-readable storage medium in communication with the first processing device and a second processing device associated with a second service provider and in communication with the first processing device. The first computer-readable storage medium may include instructions for receiving a mobile device identifier corresponding to a mobile device associated with a user of a second service provider, sending a message having an authorization code to the mobile device associated with the user, and receiving the mobile device identifier and the authorization code, receiving contact information associated with one or more contacts of an address book associated with the user, updating the received contact information and updating contact information associated with the user in one or more second address books.

28 Claims, 8 Drawing Sheets

MOBILE COMMUNICATION IN A NETWORK-DEVICE ENVIRONMENT

CROSS REFERENCE TO RELATED APPLICATIONS

This application claims priority to U.S. Patent Application No. 61/031,706 filed Feb. 27, 2008 and U.S. Patent Application No. 61/032,079 filed Feb. 28, 2008.

Not Applicable.

BACKGROUND

Typical wireless communication systems provide means for storing a set of contacts, such as an address book. The address book is usable to recall and assist in dialing or communicating with the entities associated with the entries in the address book. Furthermore, present systems generally presume a wireless communication device to be associated with a user account which is further associated with a particular wireless service provider.

This present arrangement thus impairs effective communication by mobile users, especially in the context of roaming or multi-provider arrangements. For one thing, the information about a user and the user's device is generally not available or not fully available to the network if the user is outside his or her home network. Also, this present arrangement is not conducive to rapid updating and maintenance of information relating to a user's contacts as the user and his or her mobile device move between points in an extended network, especially if such movement requires the cooperation of more than one service provider.

Accordingly, better systems and methods for managing contact information as it relates to wireless communication networks is needed. Specifically, improved and streamlined contact management systems and methods are useful for inter-provider cooperation in extended and multi-network operation for wireless communication. Some or all of the above considerations are addressed or resolved by the presently disclosed concepts, systems, and methods.

SUMMARY OF THE INVENTION

It is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Unless defined otherwise, all technical and scientific terms used herein have the same meanings as commonly understood by one of ordinary skill in the art. As used herein, the term "comprising" means "including, but not limited to."

In an embodiment, a system of provisioning contact information associated with one or more contacts of a communication device user may include a first processing device associated with a first service provider, a first computer-readable storage medium in communication with the first processing device and a second processing device associated with a second service provider and in communication with the first processing device. The first computer-readable storage medium may include programming instructions for receiving a mobile device identifier corresponding to a mobile device associated with a user of a second service provider, sending a message having an authorization code to the mobile device associated with the user, and receiving the mobile device identifier and the authorization code. The computer-readable storage medium may also include instructions for receiving contact information associated with one or more contacts of an address book associated with the user, updating the received contact information and updating contact information associated with the user in one or more second address books, where each second address book may correspond to one of the one or more contacts.

In an embodiment, a method of provisioning contact information associated with one or more contacts of a communication device user may include receiving, by a processing device associated with a first service provider, a mobile device identifier corresponding to a mobile device associated with a user of a second service provider, sending a message to the mobile device associated with the user, where the message comprises an authorization code and receiving the mobile device identifier and the authorization code. The method may also include receiving contact information associated with one or more contacts of an address book associated with the user, updating the received contact information and updating contact information associated with the user in one or more second address books, where each second address book corresponds to one of the one or more contacts.

BRIEF DESCRIPTION OF THE FIGURES

Aspects, features, benefits and advantages of the present invention will be apparent with regard to the following description and accompanying drawings, of which.

DETAILED DESCRIPTION

Figure 1:
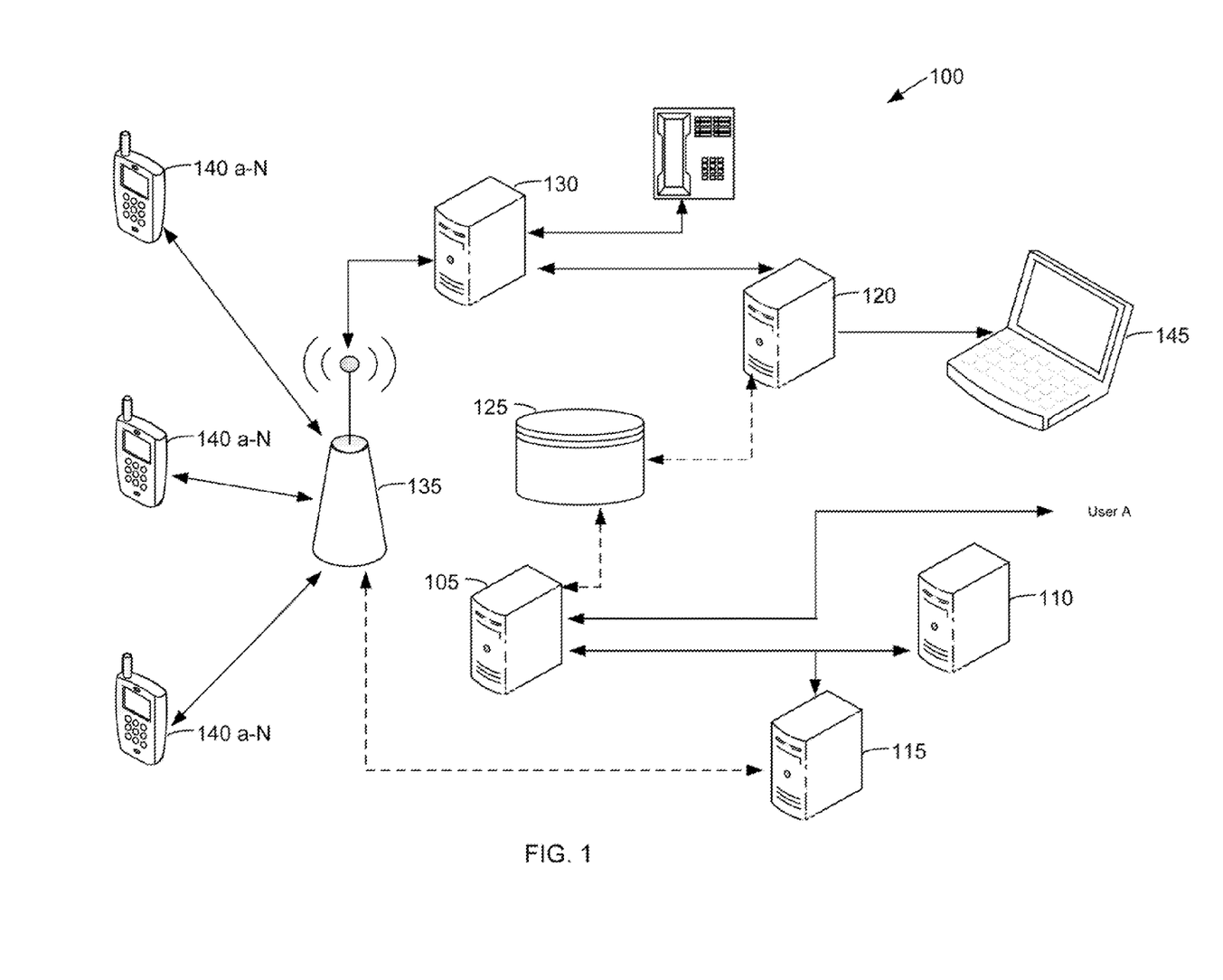
FIG. 1 illustrates an exemplary system that may be used to facilitate communication between mobile devices and/or computing devices according to an embodiment.

FIG. 1 illustrates an exemplary system that may be used to facilitate communication between mobile devices and/or computing devices. As illustrated by FIG. 1, the system 100 may include a client application 145, a processing device 105 associated with first service provider, a network address book ("NAB") processing device 115, a voice/instant messaging ("VIM") gateway 120, one or more storage mediums 125, a session initiation protocol ("SIP") media gateway processing device 130, a network 135 associated with second service provider, a translator processing device 110 and/or one or more mobile devices 140a-N associated with subscribers on the second service provider.

The client application may reside on a client processing device 145. A client processing device 145 may be any suitable type of computing device capable of responding to and executing instructions. For example a client processing device 145 may be implemented as a server, a personal computer, a workstation, a laptop computer and/or the like. As described above, the client application may be downloaded via one or more of the first service provider, the second service provider and/or the like. The client application may provide an interface, such as a graphical user interface, through which a user can register for one or more services.

In an embodiment, the processing device 105 may be a server, a web server or other processing device associated with the first service provider. The processing device 105 may communicate with the client processing device 145, the NAB processing device 115 and/or the translator processing device 110. For example, the processing device 105 may receive a request from the client processing device 145 to retrieve contact information associated with an address book of a user. The processing device 105 may obtain this contact information from the NAB processing device 115 and may send this information back to the client processing device 145.

In an embodiment, the translator processing device 110 may be a server or other processing device. The translator processing device 110 may communicate with the processing device 105. In an embodiment, the translator processing device 110 may receive an IP address associated with a mobile device 140a-N. The translator processing device 100 may translate the IP address into the MSISDN associated with the mobile device 140a-N.

In an embodiment, the NAB processing device 115 may store information associated with one or more user's contacts. In an embodiment, the NAB processing device 115 may be part of the second service provider's network. In an embodiment, the NAB processing device 115 may be part of the first service provider's network.

In an embodiment, the VIM gateway processing device 120 may communicate with the SIP media gateway processing device 130 and the processing device associated with the client application 140. In an embodiment, the VIM gateway processing device 120 may provide a media gateway functionality. The VIM gateway processing device 120 may transcode media from the SIP media gateway processing device 130 into an appropriate form for voice instance messaging services. For example, the VIM gateway processing device 120 may transcode media from the SIP media gateway processing device 130 into a voice instant messaging services that is available on the client processing device 145.

In an embodiment, the SIP media gateway processing device 130 may communicate with the network 135 and the VIM gateway processing device 120. The SIP media gateway processing device 130 may provide media gateway functionality between the circuit switched network and the packet network.

Figure 2:
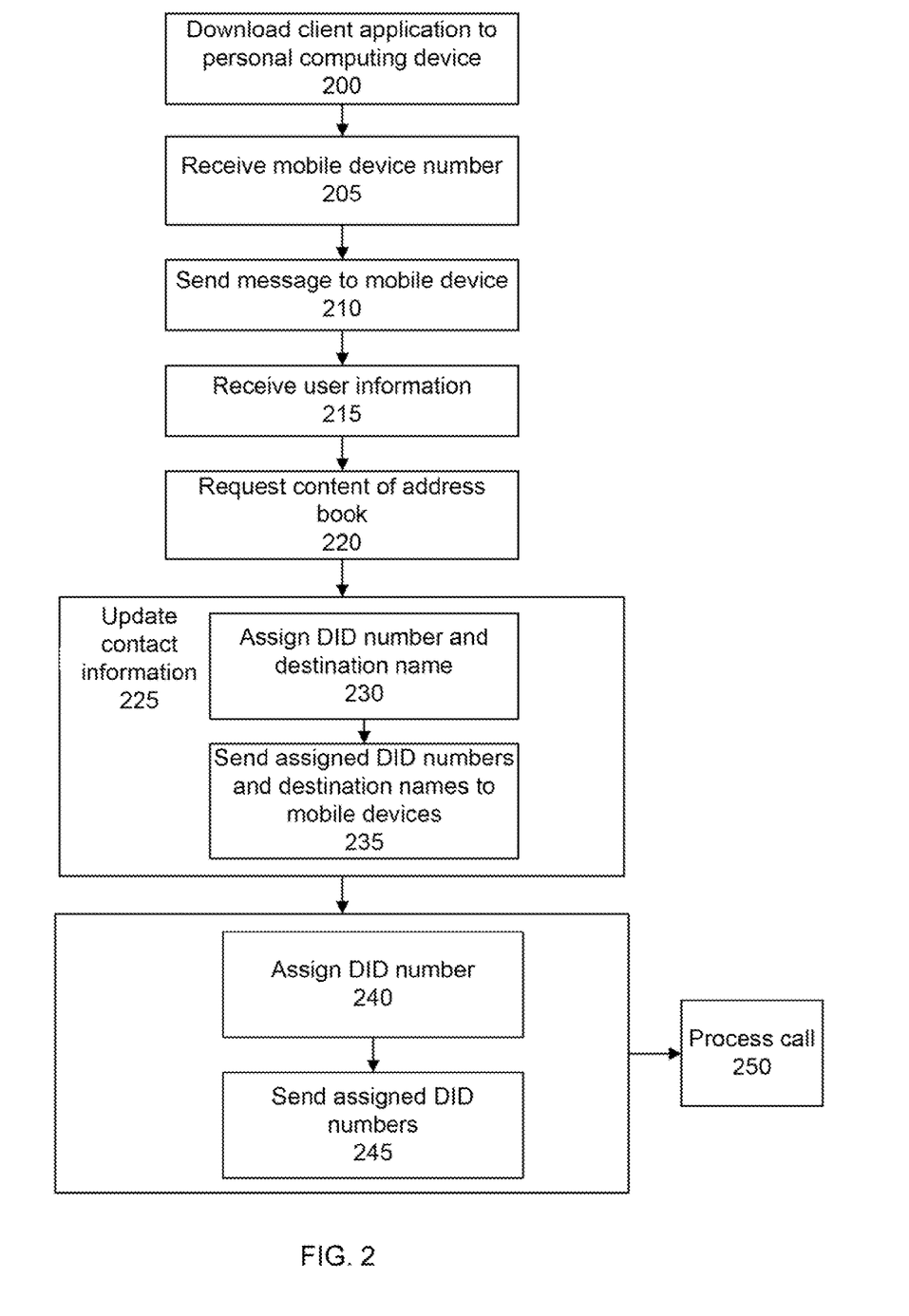
FIG. 2 illustrates an exemplary method of provisioning contact information according to an embodiment.

FIG. 2 illustrates an exemplary method of provisioning contact information according to an embodiment. In an embodiment, communication devices or client processing devices may include personal computing devices, mobile communication devices and/or the like. In an embodiment, a personal computing device may be a desktop computer, a laptop computer and/or the like. In an embodiment, a mobile communication device may be a mobile phone, a personal digital assistant ("PDA") and/or the like.

As illustrated by FIG. 2, a client application may be downloaded 200 to a computing or processing device associated with the user, such as a personal computer, laptop computer, mobile device and/or the like. In an embodiment, the client application may be downloaded 200 from the processing device 105 associated with a first service provider.

In an embodiment, the first service provider may be a cellular phone service company, a cellular phone service provider, a voice over IP ("VoIP") provider, a mobile Internet communication solution and/or the like. The user may register with the first service provider via the downloaded client application, a graphical user interface, a website and/or other application.

In an embodiment, the user may be a customer of a second service provider. The second service provider may be a cellular phone service company, a cellular phone service provider, a VoIP provider, a mobile Internet communication solution and/or the like. In an embodiment, the first service provider and the second service provider may work in conjunction to provide one or more services to a user. For example, the second service provider may provide cellular phone service to the user, while the first service provider may facilitate communication between mobile devices and computing devices over the second service provider's network.

In an embodiment, the user may enter the user's mobile device number via the client processing device 145. A mobile device number may be a cellular telephone number, a mobile station international subscriber directory number ("MSISDN"), a telephone number and/or any other similar identifier associated with a PDA, personal computer and/or mobile device. In an embodiment, a mobile device number may correspond to or include an applicable country code.

In an embodiment, the processing device 105 may receive 205 the mobile device number from the client application. For example, the application may send the mobile device number to a server on the first service provider's network. In response, the processing device may send 210 a message to the mobile device associated with the received mobile device number. In an embodiment, the message may include an authorization code. The message may be a text message such as a short message service ("SMS"), a multimedia message service ("MMS") message and/or the like.

In an embodiment, the authorization code may be provided to the client application 145. For example, the user may enter the authorization code received on the user's mobile device via the client processing device 145. In an embodiment, the processing device 105 may receive 215 user information, including, but not limited to the user's mobile device number and authorization code, from the client processing device 145.

Upon receiving 215 the user information, the processing device may request 220 the contents of the user's address book. In an embodiment, an address book may be an electronic database of information associated with one or more of the user's contacts. For example, an address book may include a name and a phone number associated with a contact. In an embodiment, a network address book ("NAB") may be stored on the NAB processing device 115. The NAB may include contact information for subscribers to the second service provider. For example, the NAB may include the names and numbers of contacts of subscribers to the second service provider. In an embodiment, the processing device 105 may request information associated with the user's contacts from the NAB processing device 115.

In an embodiment, the NAB processing device 115 may recognize a type of media or modularity associated with an entry in the NAB, and may associate the media/modularity with the entry. For example, the NAB processing device 115 may be capable of distinguishing a Twitter contact from a Gmail contact. When a user tries to connect with a Twitter contact, the NAB processing device 115 may open a Twitter platform. Similarly, when a user tries to connect with a Gmail contact, the NAB processing device 115 may open a Gmail platform. In an embodiment, the processing device 105 may provide similar functionalities. Additional and/or alternate media/modularities may be used within the scope of this disclosure.

Figure 3:
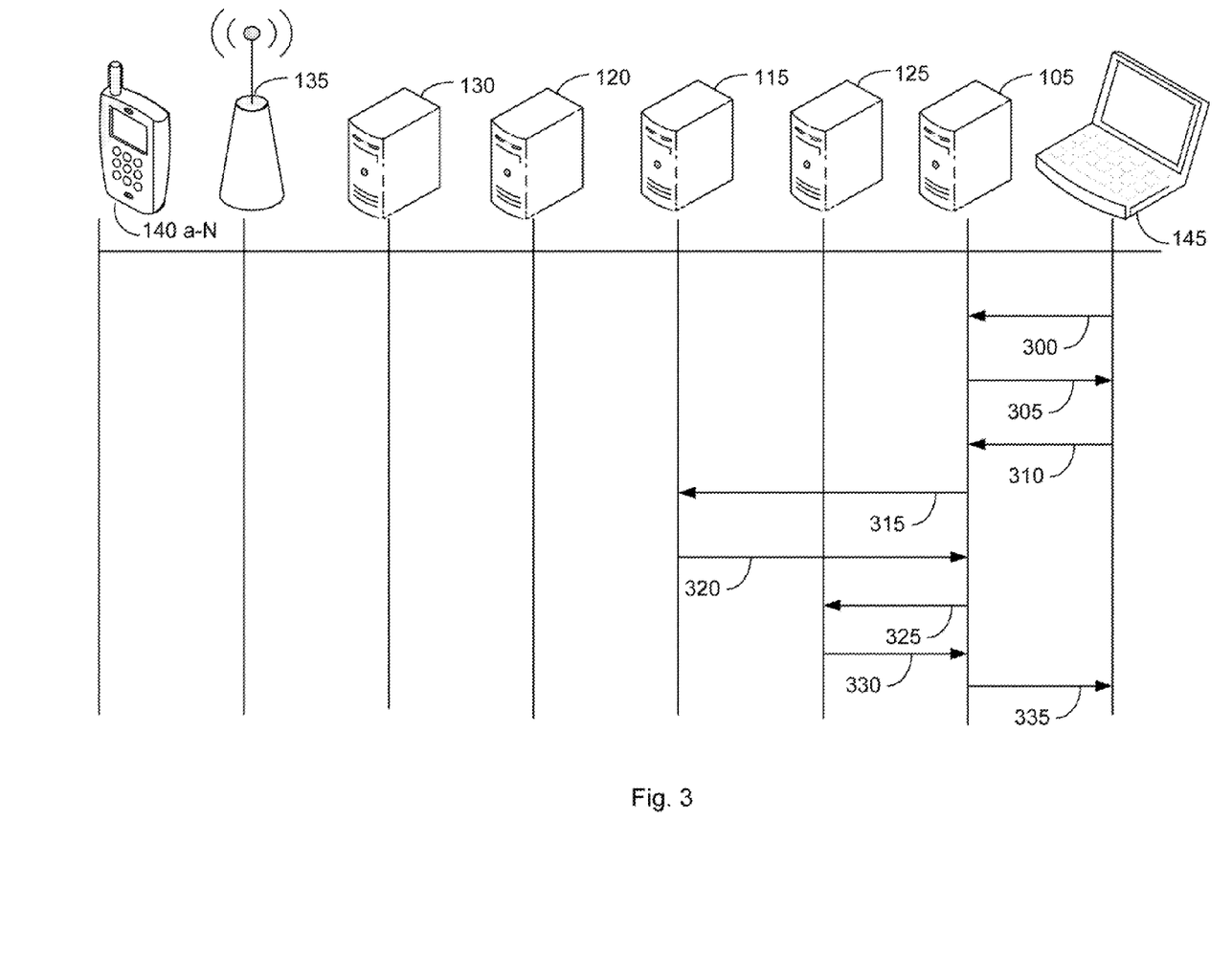
FIG. 3 illustrates an exemplary call flow of requesting and receiving contact information from a user's address book according to an embodiment.

FIG. 3 illustrates an exemplary call flow of requesting and receiving contact information from a user's address book. As illustrated by FIG. 3, a user may register 300 with the first service provider and may download 305 a client processing device 145. The client processing device 145 may transmit 310 a message to the processing device 105 requesting contact information associated with one or more contacts in the user's address book. The processing device 105 may transmit 315 a message to the NAB processing device 115 requesting contact information associated with the one or more contacts in the user's address book. The NAB processing device 115 may transmit 320 the requested contact information to the processing device 105, which may store 325 the received information in the associated storage medium 125. The processing device 105 may receive 330 a response once the information is stored, and may transmit 340 the requested contact information to the client application 140.

In an embodiment, the processing device 105 may update 225 the received contact information. For example, the processing device 105 assign 230 direct inward dialing ("DID") numbers to one or more of the user's contacts. For example, one set of DID numbers may be assigned 230 to the contacts, one per contact, in the user's address book. These numbers may enable the user to call each of his contacts from his mobile device. In an embodiment, the processing device 105 may assign 230 destination names to each assigned DID number. A destination name may refer to a label describing where a call to the associated DID number will terminate. For example, "Sarah's Mobile" may be a destination name associated with the DID number corresponding to Sarah's mobile device.

In an embodiment, the assigned DID numbers and/or destination names may be sent 235 to the user's mobile device and may be used to update the address book stored on the user's mobile device.

In an embodiment, a second set of DID numbers may be assigned, one per contact, to allow the contacts to call the user on the user's personal computing device. In an embodiment, the processing device associated with the first service provider may maintain a mapping between users, contacts and DID numbers. In an embodiment, contact information associated with the user may be updated 240 in one or more address books. For example, a DID number may be assigned 245 to the user's personal computing device. Contact information such as the assigned DID number, a destination name and/or the like, may be sent to the NAB processing device 115, where it may be incorporated into the contacts' address books. When the contacts' mobile devices synch with the NAB processing device 115, the address book on each mobile device may be updated with the user's contact information.

In an embodiment, the first service provider may be assigned a set of DID numbers from the second service provider. These numbers, when dialed, may terminate on the processing device associated with the first service provider inside the network of the second service provider.

In an embodiment, a table may be created for each registered user. In an embodiment, the size of the table may be equal to the number of DID numbers assigned by the second service provider. For example, if the second service provider allocates one thousand DID numbers to the first service provider, a table having one thousand rows may be created for each registered user. In an embodiment, each table may have three columns. One column may correspond to the MSISDN number of the caller, another column may correspond to the DID number associated with the callee and the third column may correspond to a destination address. Additional and/or alternate columns or representations of this and/or similar information are comprehended as well and may be used within the scope of this disclosure.

In an embodiment, if a DID has not been allocated, the destination address field in the table may be assigned a signifier value. The signifier value may indicate that the corresponding DID value has not yet been assigned. For example, '-1' may be used as the signifier value.

For example, if Mike, who has one contact, Steve, downloads an application from the first service provider, a table associated with Steve may be generated. The table may have a number of entries equal to the number of allocated DIDs (in this example, five). As illustrated by Table I, the destination field of each entry may initially have the signifier value (in this example, '-1').

TABLE I

| MSISDN | DID | Destination |
| --- | --- | --- |
| 1234567890 | 1215551000 | -1 |
| 1234567890 | 1215551001 | -1 |
| 1234567890 | 1215551002 | -1 |
| 1234567890 | 1215551003 | -1 |
| 1234567890 | 1215551004 | -1 |

An available DID number may be identified by searching the table for a DID number associated with a destination field having a '-1' value. This value may then be replaced with a corresponding destination. For example, in this example, the destination may be "Mike@PC" as illustrated by FIG. 2.

TABLE II

| MSISDN | DID | Destination |
| --- | --- | --- |
| 1234567890 | 1215551000 | Mike@PC |
| 1234567890 | 1215551001 | -1 |
| 1234567890 | 1215551002 | -1 |
| 1234567890 | 1215551003 | -1 |
| 1234567890 | 1215551004 | -1 |

In an embodiment, rather than allocating a table for each contact, a global table may be created. In an embodiment, the global table may have a number of entries equal to the number of allocated DID numbers. For example, if the first service provider is allocated one thousand DID numbers, a global table may include one thousand entries. More, fewer, alternate and/or additional entries may also be used within the scope of this disclosure.

Table III illustrates an exemplary global table that may be created when two new users, Jane and Bob, register for service from the first service provider. As illustrated by Table III, the second service provider may assign the first service provider a set of one hundred DID numbers (i.e., 1-212-555-1212 through 1-212-555-1312).

TABLE III

| ID | Registered User | Caller | DID | Destination |
| --- | --- | --- | --- | --- |
| 1 | Jane | Jane | 1-212-555-1212 | Bob's Mobile via VoIP |
| 2 | Jane | Jane | 1-212-555-1213 | Sarah's Mobile via VoIP |

TABLE III-continued

| ID | Registered User | Caller | DID | Destination |
|---|---|---|---|---|
| 3 | Jane | Jane | 1-212-555-1214 | Mother's Home via VoIP |
| 4 | Jane | Jane | 1-212-555-1215 | Bob @ PC |
| 5 | Jane | Jane | 1-212-555-1216 | Sarah @ PC |
| 6 | Jane | Jane | 1-212-555-1217 | Mother @ PC |
| 7 | Jane | Bob | 1-212-555-1212 | Jane @ PC |
| 8 | Jane | Sarah | 1-212-555-1212 | Jane @ PC |
| 9 | Bob | Bob | 1-212-555-1213 | Sarah's Mobile via VoIP |
| 10 | Bob | Sarah | 1-212-555-1213 | Bob @ PC |

Referring to Table III, when Jane registers with the first service provider, the processing device associated with the first service provide may automatically assign entries in the table to Jane's contacts, and the DID numbers associated with these entries may be pushed to Jane's mobile device. In an embodiment, the processing device may assign names to each contact/DID number pair. For example, "Bob@PC" may be assigned to a DID number assigned to Bob's personal computing device.

In an embodiment, DID numbers and names may be assigned to users who have not yet registered with the first service provider. For example, if Jane, after registering, tries to dial the entry in her address book for "Bob@PC," and Bob has not yet registered with the first service provider, then Jane may hear a prompt informing her that Bob has not yet registered. In an embodiment, once Bob registers with the first service provider, the call may terminate at his personal computing device.

In an embodiment, a user may have the option of selecting which contacts with whom the user would like to share the user's personal computing device number. In an embodiment, by default, all of the contacts in the user's address book may be selected. A user may deselect the contacts with whom the user does not want to share the user's personal computing device number. In an embodiment, a second set of DID numbers may be assigned to the selected contacts. For example, if Jane selects Sarah and Bob as contacts with whom she would like to share her personal computing device number, the processing device associated with the first service provider may assign a second DID number to these contacts (i.e., entries #7 and 8 in Table I).

Table IV illustrates contact information associated with an exemplary user according to an embodiment. As illustrated by Table IV, User A's address book may include entries for contacts User B and User C. In an embodiment, the NAB may include entries for these contacts associated with User A. When new information is added to the NAB, the address book on User A's mobile or other communication device may be updated.

In an embodiment, this address book may be pulled from the second service provider's network so that each contact may be provisioned with a way to contact User A via User A's personal computing device. As illustrated by Table IV, each of User A's contacts may be mapped to the contact's MSISDN number and a DID number by which they may connect with User A. For example, User B may be provisioned two entries, with one entry associated with User B's MSISDN number (i.e., 2155551111) and a DID number (i.e., DID1) associated with contacting User A on User A's personal computing device. Another entry may be associated with User B's MSISDN number (i.e., 2155551111) and a DID number (i.e., DID2) associated with contacting User A on User A's mobile device.

TABLE IV

| Contact Name | MSISDN | DID | Call Destination |
|---|---|---|---|
| User B | 2155551111 | DID1 | A@PC |
| User B | 2155551111 | DID2 | A@Mobile |
| User C | 97229945786 | DID1 | A@PC |
| User C | 97229945786 | DID2 | A@Mobile |

In an embodiment, the contact information that is generated, including but not limited to contact names. MSISDN numbers. DID numbers, call destinations, and/or the like, may be transmitted 230 to one or more of the second service provider's network, the mobile device of the user and/or the application downloaded by the user.

Figure 4:
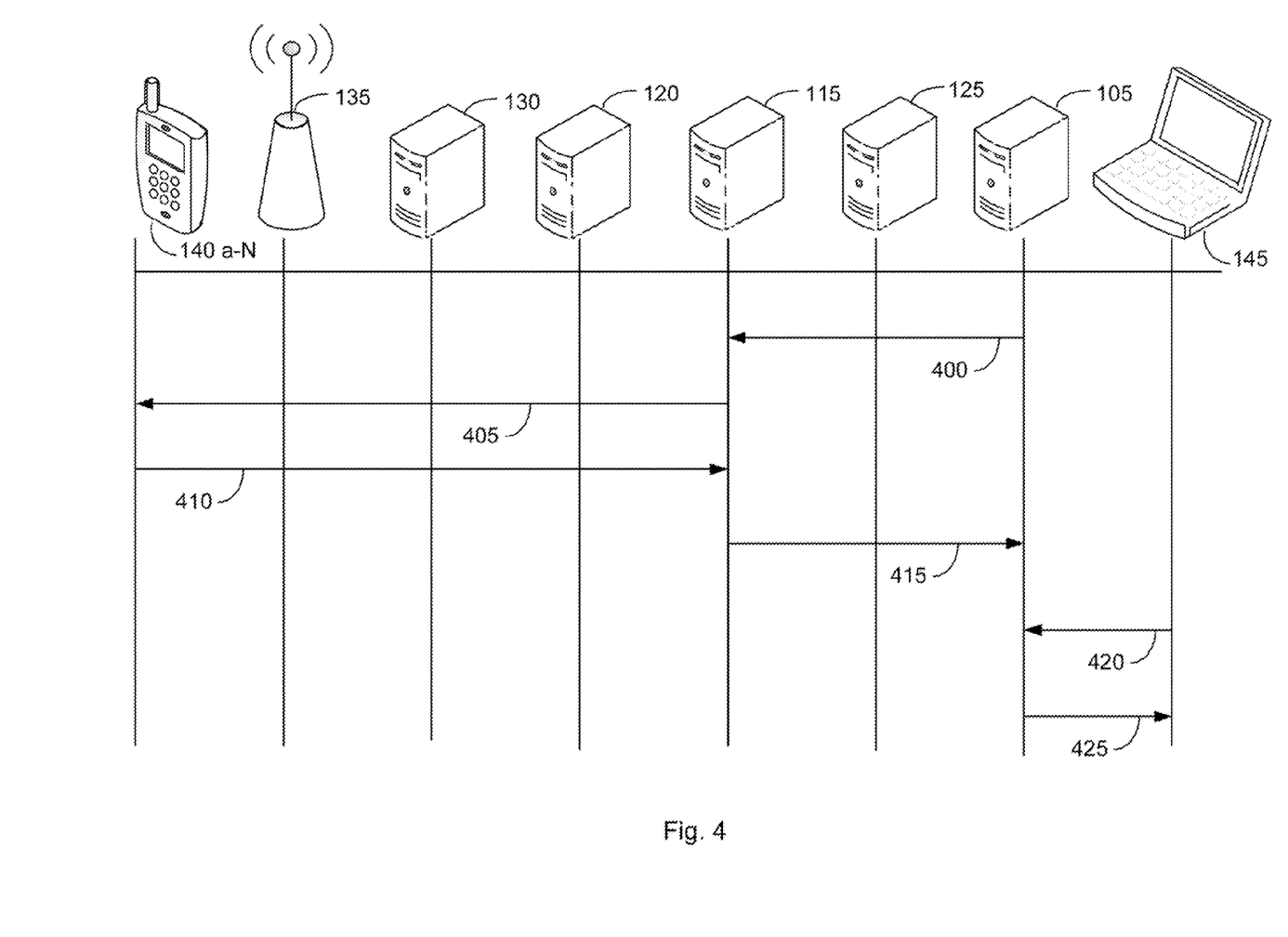
FIG. 4 illustrates a flow chart of an exemplary method of transmitting DID number information according to an embodiment.

FIG. 4 illustrates a flow chart of an exemplary method of transmitting DID number information according to an embodiment. As illustrated by FIG. 4, the processing device 105 may transmit 400 one or more DID numbers associated with one or more of a user's contacts to the NAB processing device 115. The NAB processing device 115 may add 405 these DID numbers and corresponding destination information to the address book of the mobile device 140a-N of the corresponding contact. The mobile device 140a-N may then notify 410 the NAB processing device 115 when the update is complete, and the NAB processing device may in turn notify 415 the processing device 105. The processing device 105 may notify 425 the client application 200.

In an embodiment, the processing device 105 may send a message to the mobile device associated with each of the selected contacts. In an embodiment, the message may be a text message such as an SMS message, an MMS message and/or the like. In an embodiment, the message may include a notification that the user can be reached at the user's personal computing device number once the contact synchronizes the contact's address book with the first service provider. In an embodiment, the message may include an update with the user's personal computing device number that may be downloaded to the contact's address book. As such, the contact's address book may be automatically updated with the user's new personal computing device number.

In an embodiment, only contacts who are subscribers to the same second service provider as the user may receive a message comprising a text message, such as an SMS message, an MMS message and/or the like. Contacts who are subscribers to a different second service provider than the user may receive a message comprising electronic data associated with the user such as the user's name, address, phone number, a link to a website, images and/or the like. For example, a contact may receive a V-card associated with the user. If the contact accepts the message, the contact's address book may be automatically updated with the received electronic data. For example, the contact's address book may be automatically updated with the user's new personal computing device number.

In an embodiment, the selected contact may have the option to reject the update. If the contact rejects the update, the computing device associated with the first service provider may remove the DID number associated with the contact from the user's address book. For example, if Bob downloads the application, entry #9 in Table I may be inserted. Similarly, if Bob authorizes access to Sarah, entry #10 may be added to Table I.

Figure 5:
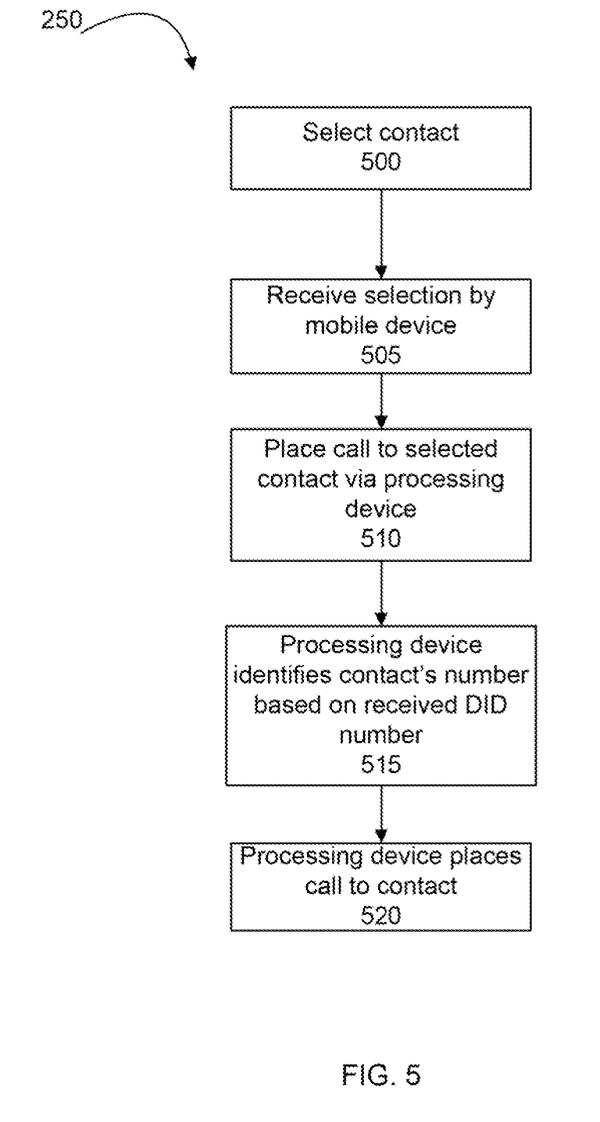
FIG. 5 illustrates an exemplary method of processing a call according to an embodiment.

In an embodiment, a call may be processed 250 between a user and a user's contact. FIG. 5 illustrates an exemplary method of processing 250 a call according to an embodiment. A user may select 500 a contact from the user's address book, a call log, a favorites list and/or the like. The selection may be received 505 by the user's mobile device. In an embodiment, after a selection is received 505, a call may be placed 510 to the DID number associated with the selected contact. In an embodiment, the call may be placed 510 from the user's mobile device and to the processing device 105. In an embodiment, the DID number associated with the selected contact may also be sent 510 to the processing device 105. The processing device 105 may identify 515 the number to call based on the received DID number associated with the selected contact and the user's mobile device number. The processing device 105 may place 520 the call to the contact at the identified number.

For example, a user may call the personal computing device associated with a contact. In an embodiment, a user may select 500 a contact from the user's address book, call log, favorite list and/or the like. For example, the user may open the user's address book on the user's mobile device and may select 500 a contact from the contact list. Similarly, the user may open the user's call log on the user's mobile device and may select 500 a contact. A user may also open a favorites list on the user's mobile device, and may select 500 a contact from the favorites list. The selection may be received 505 by the user's mobile device.

In an embodiment, the user may see a message on the mobile device indicating the selected contact's name and phone number. In an embodiment, a call may be placed 510 to the DID number associated with the selected contact's name. In an embodiment, the call may be placed from the user's mobile device to the processing device 105. In an embodiment, the DID number associated with the selected contact may also be sent 510 to the processing device 105.

The processing device associated with the first service provider may receive the call. In an embodiment, the user may hear a message when the first service provider receives the call. For example, a user may hear the message "Please wait while your call is connected."

In an embodiment, the processing device may use the user's mobile device number and the dialed DID number to identify 515 the contact to call. The processing device may place 520 a call to the personal computing device associated with the selected contact.

Figure 6:
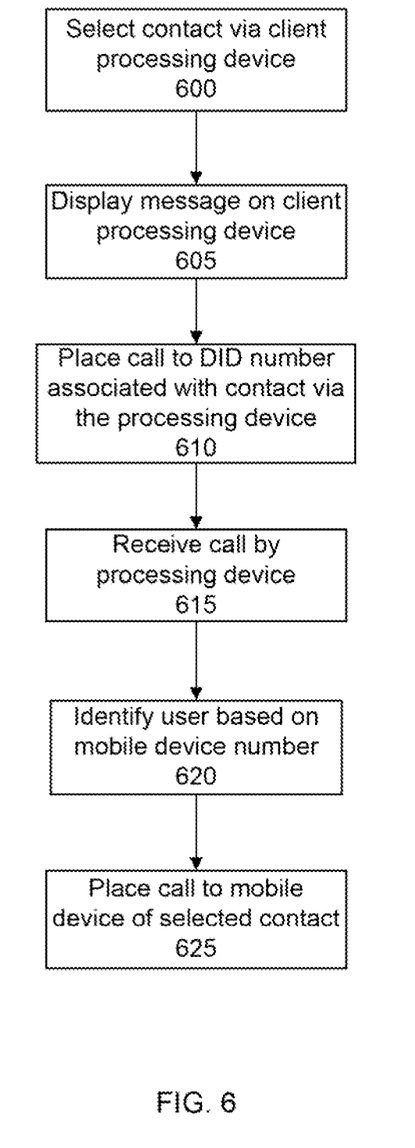
FIG. 6 illustrates an exemplary method of processing a call between a mobile device and a personal computing device.

In an embodiment, a user may call a contact from the user's personal computing device. FIG. 6 illustrates an exemplary method of processing 250 a call between a mobile device and a personal computing device.

In an embodiment, the user may open an application associated with the first service provider on the user's personal computing device. A list of the user's contacts from the user's address book may be displayed on the user's personal computing device. The user may select 600 a contact from the list. In an embodiment, the user may select 600 an icon, press a button and/or the like to initiate the call to the selected contact.

In an embodiment, a message may be displayed 605 on the user's personal computing device. The message may include the selected contact's name, phone number and/or the like. In an embodiment, a call may be placed 610 to the DID number associated with the mobile device corresponding to the selected contact. The call may be placed 610 from the user's personal computing device to the processing device. In an embodiment, the call may be received 615 by the processing device associated with the first service provider. The processing device may identify 620 the user based on the user's mobile device number. The processing device may dial the contact's mobile device number, and may place 625 the call to the mobile device associated with the contact.

Figure 7:
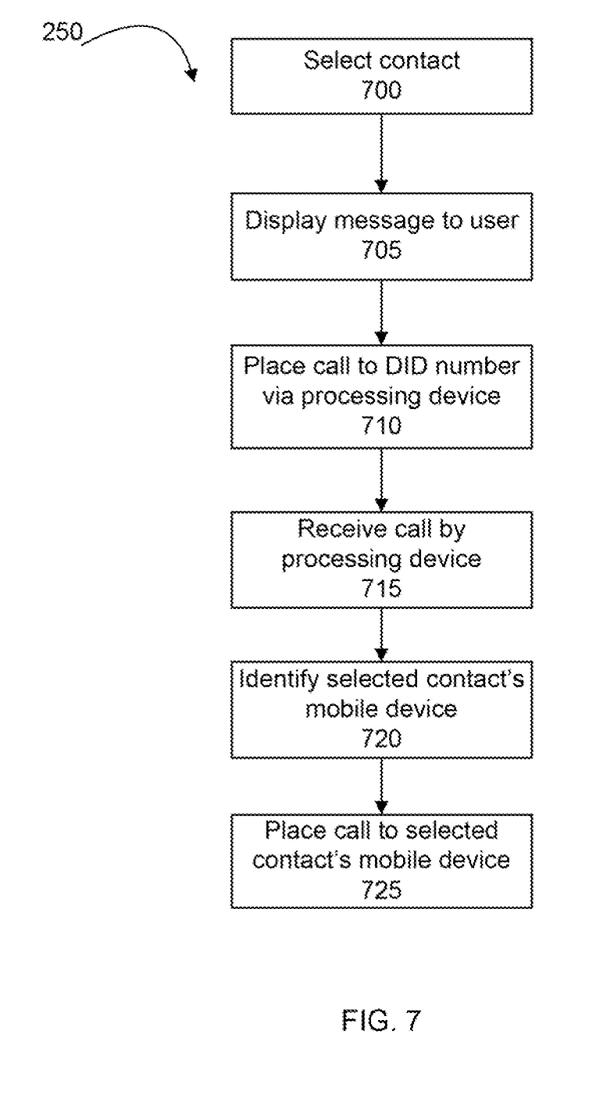
FIG. 7 illustrates an exemplary method of processing a call to contact by selecting a DID number according to an embodiment.

In an embodiment, a user may place a call to a contact by selecting the DID number associated with the contact. FIG. 7 illustrates an exemplary method of processing 250 a call to contact by selecting a DID number according to an embodiment. As illustrated by FIG. 7, a user may select 700 the DID number that the first service provider assigned to the contact. In an embodiment, the user may select 700 the DID from the user's address book, the user's call log, the user's favorites list and/or the like.

In an embodiment, a message may be displayed 705 to the user that includes the selected contact's name and phone number. A call may be placed 710 to the DID number corresponding to the number assigned by the processing device associated with the first service provider. In an embodiment, the call may be placed 710 from the user's mobile device, and may be received 715 by the processing device. The user may hear a message when the first service provider receives the call. For example, a user may hear the message "Please wait while your call is connected."

In an embodiment, the processing device may identify 720 the contact's mobile device based on the user's mobile device number and the DID number that was called. The processing device may place 725 the call to the contact's mobile device.

Figure 8:
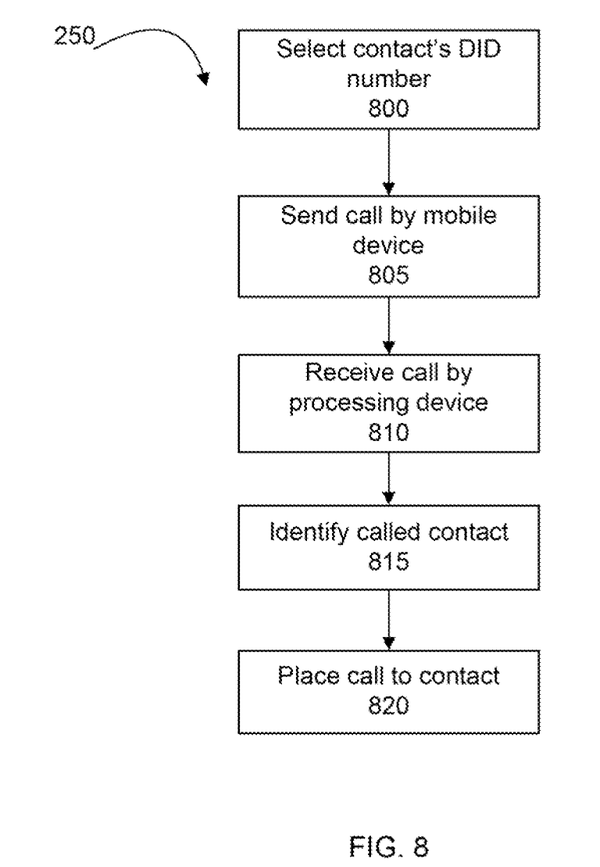
FIG. 8 illustrates an exemplary method of processing a call to a contact's landline number according to an embodiment.

In an embodiment, a user may call a contact's landline number from the user's mobile device using the DID number assigned to the contact. FIG. 8 illustrates an exemplary method of processing 250 a call to a contact's landline number according to an embodiment. As illustrated by FIG. 8, a user may select 800 the contact's DID number instead of calling the public switched telephone network ("PSTN") number directly. In an embodiment, the user may select 800 a DID number associated with a contact from the contact's address book, call log, favorites list and/or the like. The call may be sent 805 by the user's mobile device and may be received 810 by the processing device. In an embodiment, the user may hear a message after the processing device receives the call. For example, the user may hear an audio message such as "Please wait while your call is connected."

In an embodiment, the processing device may identify 815 the called contact based on the user's mobile device number and the DID number that the user called. The processing device may place 820 the call to the contact.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system of provisioning contact information associated with one or more contacts of a user of a communication device, the system comprising:
  a first processing device associated with a first service provider;
  a first computer-readable storage medium in communication with the first processing device;
  wherein the first computer-readable storage medium comprises:
    programming instructions for sending a message to a mobile device associated with the user, wherein the message comprises an authorization code;
    programming instructions for receiving a mobile device identifier and the authorization code from a client processing device;

programming instructions for requesting, in response to receiving the mobile device identifier and the authorization code, contact information associated with one or more contacts of an address book associated with the user;

programming instructions for assigning a direct inward dialing number and a destination name to each contact of the address book; and programming instructions for updating, in one or more second address books, information useable to contact the user, wherein each second address book corresponds to one of the one or more contacts.

2. The system of claim 1, further comprising:
programming instructions for receiving, from the client processing device associated with the user, the mobile device identifier, wherein the mobile device identifier comprises a mobile station international subscriber directory number and a country code.

3. The system of claim 2, wherein the programming instructions for receiving the mobile device identifier comprise programming instructions for receiving, from the client processing device, the mobile device identifier before sending the message to the mobile device.

4. The system of claim 1, wherein the programming instructions for sending the message to the mobile device associated with the user comprise sending one or more of the following:
a short message service message; or
a multimedia message service message.

5. The system of claim 1, further comprising:
programming instructions for sending the assigned direct inward dialing numbers and the destination names to the mobile device associated with the user.

6. The system of claim 5, wherein the programming instructions for assigning the direct inward dialing number comprise assigning a direct inward dialing number that is allocated by a second service provider.

7. The system of claim 1, wherein the programming instructions for updating the information useable to contact the user in the one or more second address books comprise:
programming instructions for assigning a direct inward dialing number associated with the user to one or more of the one or more contacts; and
programming instructions for sending the assigned direct inward dialing number to a second processing device in communication with the first processing device.

8. The system of claim 7, wherein the programming instructions for assigning the direct inward dialing number associated with the user comprise assigning a direct inward dialing number that is allocated by a second service provider.

9. The system of claim 1, wherein the programming instructions for updating the information useable to contact the user comprise:
programming instructions for receiving, from the client processing device associated with the user, a selection of which contacts of the address book are to receive the information useable to contact the user; and
programming instructions for sending a message to a mobile device associated with the selected contacts, wherein the message informs the contact of the information useable to contact the user, wherein the information useable to contact the user comprises one or more of the destination name, a telephone number, a personal computer number or the direct inward dialing number of the user.

10. The system of claim 1, further comprising:
a second computer-readable storage medium in communication with a second processing device, wherein the second computer-readable storage medium is configured to store a network address book for subscribers of a second service provider.

11. The system of claim 1, further comprising one or more programming instructions for processing a call between the user and a callee.

12. The system of claim 11, wherein the one or more programming instructions for processing the call comprises one or more programming instructions for:
receiving, from the mobile device associated with the user, the call to the callee, wherein the callee is a contact in the address book associated with the user, wherein the call comprises a direct inward dialing number associated with the callee;
identifying a telephone number associated with the callee based on the direct inward dialing number; and
connecting a call between the mobile device associated with the user and a communication device associated with the identified telephone number.

13. The system of claim 12, wherein the one or more programming instructions for receiving the call comprises one or more programming instructions for:
receiving, from the mobile device associated with the user, a selection of the callee, wherein the callee is selected using one or more of the following:
the address book associated with the user;
a call log; or
a favorites list.

14. A method of provisioning contact information associated with one or more contacts of a user of a communication device, the method comprising:
sending a message to a mobile device associated with the user, wherein the message comprises an authorization code;
receiving a mobile device identifier and the authorization code from a client processing device;
in response to receiving the mobile device identifier and the authorization code, requesting, by the processing device, contact information associated with one or more contacts of an address book associated with the user;
assigning, by the processing device, a direct inward dialing number and a destination name to each contact of the address book; and
updating, in one or more second address books, information useable to contact the user, wherein each second address book corresponds to one of the one or more contacts.

15. The method of claim 14, further comprising:
receiving the mobile device identifier from the client processing device associated with the user, wherein the mobile device identifier comprises a mobile station international subscriber directory number and a country code.

16. The method of claim 15, wherein receiving the mobile device identifier comprises receiving the mobile device identifier from the client processing device before sending the message to the mobile device.

17. The method of claim 14, wherein sending the message to the mobile device associated with the user comprises sending one or more of the following:
a short message service message; or
a multimedia message service message.

18. The method of claim 14, further comprising:
sending the assigned direct inward dialing numbers and the destination names to the mobile device associated with the user.

19. The method of claim 14, wherein assigning the direct inward dialing number comprises assigning a direct inward dialing number that is allocated by a second service provider.

20. The method of claim 14, wherein updating the information useable to contact the user in the one or more second address books comprises:
assigning a direct inward dialing number associated with the user to one or more of the one or more contacts; and
sending the assigned direct inward dialing number to a second processing device in communication with the processing device.

21. The method of claim 20, wherein assigning the direct inward dialing number associated with the user comprises assigning a direct inward dialing number that is allocated by a second service provider.

22. The method of claim 14, wherein updating the information useable to contact the user comprises:
receiving, from a client processing device associated with the user, a selection of which contacts of the address book are to receive the information useable to contact the user; and
sending a message to a mobile device associated with the selected contacts, wherein the message informs the contact of the information useable to contact the user, wherein the information useable to contact the user comprises one or more of the destination name, a telephone number, a personal computer number or the direct inward dialing number of the user.

23. The method of claim 14, wherein processing a call comprises:
receiving, from the mobile device associated with the user, the call to a callee, wherein the callee is a contact in the address book associated with the user, wherein the call comprises a direct inward dialing number associated with the callee;
identifying a telephone number associated with the callee based on the direct inward dialing number; and
connecting a call between the mobile device associated with the user and a communication device associated with the identified telephone number.

24. The method of claim 23, wherein receiving the call comprises:
receiving, from the mobile device associated with the user, a selection of the callee, wherein the callee is selected using one or more of the following:
the address book associated with the user;
a call log; or
a favorites list.

25. An apparatus for provisioning contact information associated with one or more contacts of a user of a communication device, the apparatus comprising:
means for sending a message to a mobile device associated with the user, wherein the message comprises an authorization code;
means for receiving a mobile device identifier and the authorization code;
means for requesting, by the processing device, contact information associated with one or more contacts of an address book associated with the user in response to receiving the mobile device identifier and the authorization code;
assigning a direct inward dialing number and a destination name to each contact of the address book; and
means for updating, in one or more second address books, information useable to contact the user, wherein each second address book corresponds to one of the one or more contacts.

26. A non-transitory computer-readable medium for provisioning contact information associated with one or more contacts of a user of a communication device, an apparatus comprising:
at least one instruction for sending a message to a mobile device associated with the user, wherein the message comprises an authorization code;
at least one instruction for receiving a mobile device identifier and the authorization code;
at least one instruction for requesting, by the processing device, contact information associated with one or more contacts of an address book associated with the user in response to receiving the mobile device identifier and the authorization code;
at least one instruction for assigning a direct inward dialing number and a destination name to each contact of the address book; and
at least one instruction for updating, in one or more second address books, information useable to contact the user, wherein each second address book corresponds to one of the one or more contacts.

27. The method of claim 14, wherein the processing device requests the contact information from a network address book processing device.

28. The method of claim 14, wherein the first service provider comprises one of a cellular phone service company, a cellular phone service provider, a voice over Internet protocol (VoIP) provider, or a mobile Internet communication solution.

* * * * *